April 5, 1932. A. B. STEWART 1,852,941
METHOD OF TREATING AND PACKAGING RIPE OR GREEN OLIVES
Filed April 2, 1930
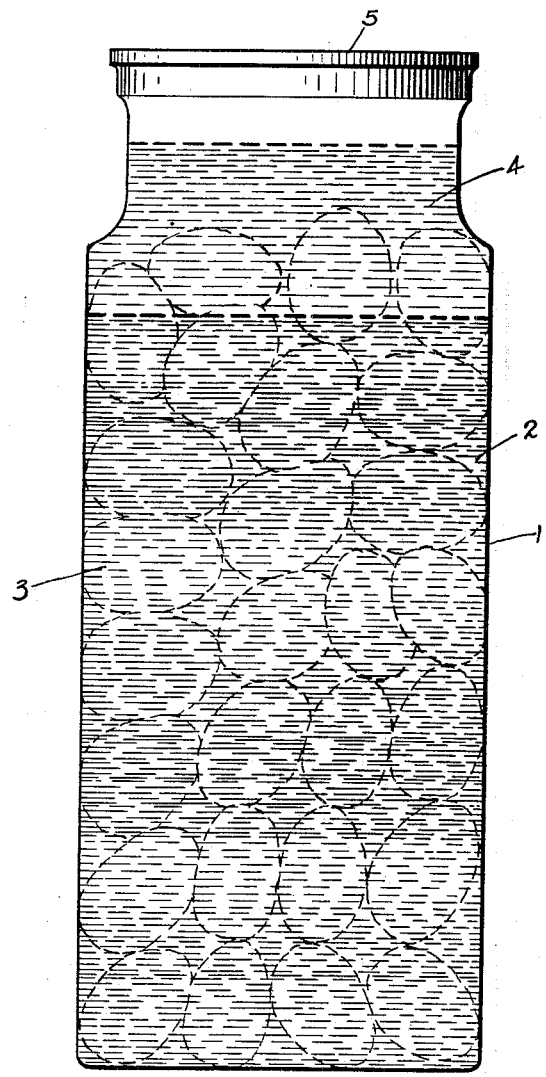
Inventor
ALEXANDER B. STEWART
By Bernard F. Garvey
Attorney Patented Apr. 5, 1932

1,852,941

UNITED STATES PATENT OFFICE

ALEXANDER B. STEWART, OF LOS ANGELES, CALIFORNIA, ASSIGNOR TO STEWART CURTIS PACKERS, INC., OF LOS ANGELES, CALIFORNIA, A CORPORATION OF DELAWARE

METHOD OF TREATING AND PACKAGING RIPE OR GREEN OLIVES

Application filed April 2, 1930. Serial No. 441,077.

The present invention consists of a new method of treating and packaging ripe or green olives.

Customarily, olives are now packaged so as to be completely immersed in a salt brine solution, or like pereservative, which is discarded when the olive container is opened. The primary object of the present invention is to use, in conjunction with the salt brine solution, an edible oil, or like vehicle impregnated with materials for improving the taste and adding piquancy to the flavor of the olives, the oil, because of its buoyancy, being removable from the surface of the brine, in a facile manner, for use as a dressing for the olives when the latter are served.

Another object of the invention is to treat the olives either before packing the same in the containers, or after the olives are removed therefrom, in such manner that the surface of the olive is enveloped in a film of edible oil which is specially prepared to not only improve the taste and add piquancy to the flavor of the olives, but to additionally increase the nutritive properties of the olives and to give an added therapeutical value thereto, in addition to maintaining the natural conformation of the olives for an indefinite period of time, after having been exposed to the air.

A coordinate object of the invention is to package olives in a container which carries a salt brine solution and/or an edible oil, with solution of brine being impregnated with flavoring extracts, spices or the like, which are carried into the olives during the cooking and sterilizing process.

Other objects of the invention will be apparent from the following description of the present preferred form of the invention, taken in conjunction with the accompanying drawing, wherein The figure is an elevational view of a transparent container in which olives are packed in accordance with the teaching of the present invention.

It is well known in the art to package olives in glass bottles, jars and other containers, it being customary to immerse the olives in a salt brine solution, after which the container is capped, sealed and, where the olives are ripe, sterilized. When the olives are served, the salt brine solution is discarded. The present invention also contemplates the use of a container as indicated at 1, in the drawing, the container carrying a salt brine solution or like preservative 2, in which olives 3 are immersed. As a rule, the container is filled with the salt brine solution to a point appreciably above the top of the olives, and a vacuum space is provided between the surface of the brine and the sealed closure. It is the purpose of the present invention to deposit on top of the salt brine an edible oil, as indicated at 4, which in the present instance is preferably olive oil, and is impregnated with a flavoring extract and/or spices and/or garlic in cubes or otherwise. The oil is of course, non-miscible with the salt brine solution and is consequently maintained in a state of suspension above the solution. The surface of the edible oil falls short of the top of the container, the latter being sealed with a closure 5 in the customary manner. After the closure is sealed on the container, the cooking and sterilizing process takes place, in a manner well-known in the art. If desired, the olives may be subjected to an edible oil bath before being immersed in the salt brine solution and in addition, the edible oil may be floated on the top of the salt brine, as illustrated in the drawing, and the olives served in the edible oil, the latter acting as a dressing or sauce for the olives.

I have also found that garlic either in cubes, the juice of pressed garlic, or garlic extract may be added to the brine and the flavor of the garlic will be carried into the olives during the cooking and sterilizing process. Furthermore, I have found that an edible oil such as olive oil, may be impregnated with garlic or other spices or flavors and the olives immersed therein in a container without using the salt brine solution, the cooking and sterilizing carrying the flavors into the olives. It is an especial object of this invention, however, to pack the olives so that the flavor of garlic and oil, and/or other flavors or spices, are cooked into the olives at the time of packing at the factory. It is then unnecessary to subject the olives to any pre-treatment before serving and the edible oil in the container may be employed as a dressing or sauce when the olives are served.

Assuming that the olives are packaged in the salt brine solution with the oil suspended on the top thereof, it is apparent that after the container has been opened the oil may be raised to the top of the container for convenient removal from the latter by adding water to the container. The olives may then be served in the oil, or may be rolled in the oil, to lightly coat them with the latter and served in this way.

It is to be understood that various changes may be made in the method herein employed within the scope of the claims hereto appended.

What is claimed is:—

1. A method of packaging olives, consisting in immersing the olives in a salt brine solution impregnated with flavors, following which an edible oil is added to the top of the brine and the container then sealed, cooked and sterilized.

2. A method of packaging olives in a container, consisting in immersing the olives in a salt brine solution carried by the container, after which an edible oil is deposited on the surface of the brine and the container then sealed and sterilized.

ALEXANDER B. STEWART.